(12) United States Patent
Caplin et al.

(10) Patent No.: US 11,934,218 B2
(45) Date of Patent: Mar. 19, 2024

(54) ADJUSTABLE SLIDE KNOB WITH SAFETY LOCK

(71) Applicant: Anchor Health & Fitness, Inc., Salem, MA (US)

(72) Inventors: Zachary D. Caplin, Salem, MA (US); Paul J. Kenney, Beverly, MA (US); Arthur N. Herring, Salem, MA (US); Isaac E. H. Lewis, Windsor (CA)

(73) Assignee: Anchor Health & Fitness, Inc., Salem, MA (US)

( * ) Notice: Subject to any disclaimer, the term of this patent is extended or adjusted under 35 U.S.C. 154(b) by 0 days.

(21) Appl. No.: 18/136,480

(22) Filed: Apr. 19, 2023

(65) Prior Publication Data

US 2023/0333588 A1 Oct. 19, 2023

Related U.S. Application Data

(60) Provisional application No. 63/332,473, filed on Apr. 19, 2022.

(51) Int. Cl.
*G05G 5/00* (2006.01)
*F16B 37/08* (2006.01)
(Continued)

(52) U.S. Cl.
CPC ......... *G05G 5/005* (2013.01); *F16B 37/0857* (2013.01); *F16B 37/12* (2013.01);
(Continued)

(58) Field of Classification Search
CPC ............ G05G 1/02; G05G 1/082; G05G 1/10; G05G 1/12; G05G 5/005; G05G 5/02;
(Continued)

(56) References Cited

U.S. PATENT DOCUMENTS

| 150,900 | A | * | 5/1874 | Silver et al. | ............ | B25B 1/125 |
| | | | | | | 81/4 |
| 422,361 | A | * | 3/1890 | Alton | .................. | F16B 37/0864 |
| | | | | | | 411/433 |

(Continued)

FOREIGN PATENT DOCUMENTS

DE 10064530 C1 * 7/2002 .......... F16B 37/0807

*Primary Examiner* — Adam D Rogers
(74) *Attorney, Agent, or Firm* — Burns & Levinson LLP; Rebecca C. Christon

(57) ABSTRACT

The presently disclosed adjustable slide knob addresses the 'Backing-Off' problem present with various conventional nuts. The adjustable slide knobs can be quickly positioned along a threaded rod by applying pressure to an exposed surface of a partially threaded nut. When the knob is placed against a work surface and the user releases pressure from the partially threaded nut, the thread pattern on the partially threaded nut meshes with the matching thread pattern on the threaded rod. The device can then be twisted, which will translate the device along the threaded rod, to apply a larger load to the work surface. The threaded rod may include one or more key-ways shaped to allow a locking tab housed within the knob to stop the device from freely disengaging the threaded rod to protect a user from potential injury caused by the fastener unexpectedly backing off and disengaging.

12 Claims, 10 Drawing Sheets

(51) Int. Cl.
 *F16B 37/12* (2006.01)
 *F16B 39/10* (2006.01)
 *F16B 41/00* (2006.01)
 *G05G 5/04* (2006.01)
 *G05G 5/12* (2006.01)
 *G05G 5/18* (2006.01)

(52) U.S. Cl.
 CPC ............ *F16B 39/10* (2013.01); *F16B 41/005* (2013.01); *G05G 5/04* (2013.01); *G05G 5/18* (2013.01); *F16B 2200/403* (2018.08); *F16B 2200/79* (2023.08)

(58) Field of Classification Search
 CPC .. G05G 5/04; G05G 5/05; G05G 5/12; G05G 5/18; G05G 5/24; A63B 21/0728; F16B 37/08; F16B 37/0807; F16B 37/0857; F16B 37/0864; F16B 37/12; F16B 39/10; F16B 41/002; F16B 41/005; F16B 2200/403; F16B 2200/79
 See application file for complete search history.

(56) References Cited

U.S. PATENT DOCUMENTS

| | | | | |
|---|---|---|---|---|
| 924,122 | A * | 6/1909 | Williams | B30B 1/18 74/424.78 |
| 2,218,319 | A * | 10/1940 | Pfauser | B66F 3/08 269/182 |
| 2,644,498 | A * | 7/1953 | Malecki | B25B 5/10 269/182 |
| 2,671,482 | A * | 3/1954 | Gordon | B25B 5/10 269/182 |
| 4,693,656 | A * | 9/1987 | Guthrie | F16B 21/16 411/433 |
| 4,738,446 | A * | 4/1988 | Miles | A63B 21/0728 24/580.11 |
| 6,599,293 | B2 * | 7/2003 | Tague | A61B 17/8833 606/94 |
| 8,471,133 | B1 * | 6/2013 | Lin | G10D 13/063 84/421 |
| 10,327,591 | B2 * | 6/2019 | Starr | A47J 37/0814 |
| 10,520,113 | B1 * | 12/2019 | Thompson | F16L 3/22 |
| 2005/0042059 | A1 * | 2/2005 | Bremer | F16B 37/0857 411/433 |

* cited by examiner

ADJUSTABLE SLIDE KNOB WITH SAFETY LOCK

CROSS-REFERENCE TO RELATED APPLICATIONS

This application claims the benefit of U.S. Provisional Patent Application No. 63/332,472, filed Apr. 19, 2022, the entire contents of which are incorporated by reference herein.

FIELD OF THE INVENTION

The present disclosure relates to an adjustable slide knob device and, more particularly, to an adjustable slide knob configured to engage with a threaded rod.

BACKGROUND

Conventional quick-adjust devices often include a housing in the form of a 'handle' or 'knob' that surrounds a partially threaded nut on all sides but the 'top' and has a hole used as the insertion point to accept a threaded rod with a matching specification to the desired thread on the partially threaded nut. The partially threaded nut is a cylinder matching the geometry of its location in the housing. The partially threaded nut has a compound through-hole comprised of a threaded through-hole bisected by a slightly larger second through-hole orthogonal to the curved surface. This compound through-hole is formed from a threaded through-hole intersecting a slightly larger diameter through-hole that retains the largest amount of thread possible, so the threaded rod may slide from the untapped section of the compound through-hole unimpeded to engage the threaded portion of the through-hole. This compound through-hole can have a shape and appearance similar to a Venn-diagram, where one side of the diagram is a larger diameter than the other. These two features of this hole are aligned vertically along the cylinder with the threaded section of the hole closer to the 'bottom' of the nut and the larger hole closer to the exposed top surface.

The partially threaded nut rests on a compression spring that applies force between the internal 'floor' of the housing and the 'bottom' of the nut. The user depresses the partially threaded nut, against the spring force, into the housing. This aligns the partially threaded nut's through hole and the insertion point, allowing the insertion point of the device to 'open' and accept the desired threaded rod. The user inserts the threaded rod into the insertion point of the housing until the threaded rod passes through the partially threaded nut and may exit the housing. Once the threaded rod is in position, the user releases the partially threaded nut. The force from the spring engages the thread of the nut and the thread of the threaded rod. The user can then secure the knob further by twisting/tightening it around the threaded rod, utilizing the clamping force of the thread engagement to secure the knob against a work surface or item against a work surface. The user can then depress the top of the partially threaded nut to release it from the threaded rod and be able to remove the threaded rod from the nut, or the user can un-thread the nut from the threaded rod in a way similar to how a traditional nut is removed from a threaded rod.

SUMMARY

Conventional adjustable knobs experience many shortcomings. For example, the partially threaded nut being a cylinder allows its partially threaded through-hole to rotate out of alignment with the insertion point of the knob/handle housing, forcing the user to have to realign the nut with the insertion point for the device to be usable. Also, the partially threaded nut and spring are free-floating in the housing and are not secured by any self-contained method when the device is prone. The existing designs rely on an external method of holding the nut inside the housing, the user depressing the nut, or the nut being in active use for the device to remain intact. This can be irritating for the user since the entire assembly can fall/spring apart with the spring launching the nut and itself out of the housing, forcing the user to search for and find the parts to reassemble the product before use or for their next use. Additionally, existing housings have not built in a way, mechanically fastened or adhered, to reduce the marring of the housing against the item or work surface. Furthermore, while the device is in use against the work surface, it is possible that the device will translate away from said work surface. This is called 'Backing off' and is a common issue with many knobs and nuts when the work surface has any kind of vibration or repeated cyclic load that makes its way to the device. Existing devices have no form of safety mechanism built in to stop the knob from fully backing off a threaded rod. Any normal nut can vibrate and back off a threaded rod, however one that does not have a full 360° coverage around the thread can experience even more translation due to vibrations. There is currently nothing in the designs to account for this fact, save Nylok® that can be applied to the inside of a more standard nut in line with the thread. However, Nylok® has not been implemented on other quick-release or spring-loaded knobs/nuts as described previously.

There is therefore a need for a way to secure one or more items along a threaded rod against a work surface, with both fine and coarse adjustment methods, to prevent the nut from loosening or backing-off to the point of complete disengagement at various fixed positions. An adjustable slide knob with safety lock is described herein to overcome the challenges associated with conventional adjustable knobs previously discussed herein. The "adjustable slide knob" described herein is, at times, referred to as a "slide knob" or simply "knob."

An adjustable slide knob configured to engage with a threaded rod is described herein. The adjustable slide knob includes a knob housing and a partially threaded nut retained within the knob housing. The knob housing includes a locking tab, a locking tab spring positioned to apply a load to the locking tab, and a primary spring positioned to apply a radial load to an engaged threaded rod. The locking tab is configured to couple with the partially threaded nut. The partially threaded nut and the threaded rod each contain a matching thread pattern.

In some embodiments, the threaded rod includes a shaft cut with a key-way sized to allow the locking tab to self-engage. In these and other embodiments, the key-way is cut closer to a central axis of the shaft than a major thread diameter of the threaded rod. The partially threaded nut may also include a shelf cut into an underside of the partially threaded nut to couple the locking tab to the partially threaded nut. In some such embodiments, when the partially threaded nut is engaged on the threaded rod and the locking tab is not engaged in the keyway, the locking tab may separate from the shelf and passively ride along threading of the threaded rod. In select embodiments, the locking tab and the partially threaded nut may disengage from the threaded rod using a single action by a user.

The partially threaded nut may have a circular shape or a non-circular shape. In some embodiments, the partially threaded nut includes a compound through-hole of a threaded through-hole bisected by a second through-hole having a larger diameter than the threaded through-hole, wherein an axis of the threaded through-hole and an axis of the second through-hole are parallel. In select embodiments, a ring may be positioned between the knob housing and a work surface. The adjustable slide knob may also include a retention pin to retain the partially threaded nut within the knob housing, in some embodiments.

A reading of the following detailed description and a review of the associated drawings will make apparent the advantages of these and other structures. Both the foregoing general description and the following detailed description serve as an explanation only and do not restrict aspects of the disclosure as claimed.

BRIEF DESCRIPTION OF THE DRAWINGS

Reference to the detailed description, combined with the following figures, will make the disclosure more fully understood, wherein:

FIG. 6A shows a front view of the nut, FIG. 6B shows a side view of the nut, and FIG. 6C shows an isometric view of the nut;

DETAILED DESCRIPTION

Figure 1:
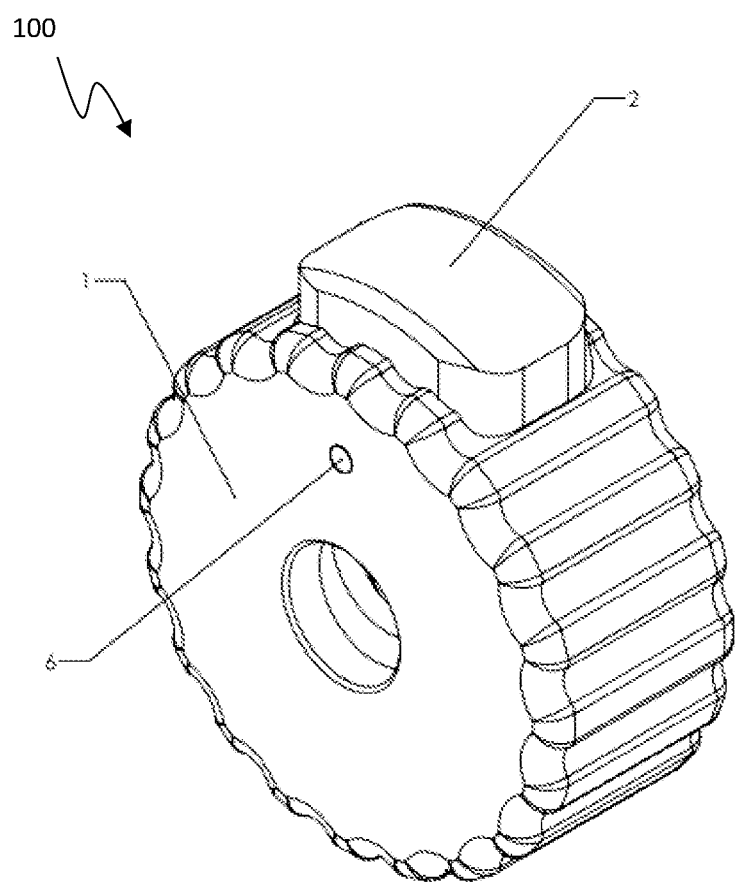
FIG. 1 shows an external isometric view of the presently disclosed slide knob.

In the following description, like components have the same reference numerals, regardless of different illustrated embodiments. To illustrate embodiments clearly and concisely, the drawings may not necessarily reflect appropriate scale and may have certain structures shown in somewhat schematic form. The disclosure may describe and/or illustrate structures in one embodiment, and in the same way or in a similar way in one or more other embodiments, and/or combined with or instead of the structures of the other embodiments.

In the specification and claims, for the purposes of describing and defining the invention, the terms "about" and "substantially" represent the inherent degree of uncertainty attributed to any quantitative comparison, value, measurement, or other representation. The terms "about" and "substantially" moreover represent the degree by which a quantitative representation may vary from a stated reference without resulting in a change in the basic function of the subject matter at issue. Open-ended terms, such as "comprise," "include," and/or plural forms of each, include the listed parts and can include additional parts not listed, while terms such as "and/or" include one or more of the listed parts and combinations of the listed parts. Use of the terms "top," "bottom," "above," "below" and the like helps only in the clear description of the disclosure and does not limit the structure, positioning and/or operation of the adjustable slide knob in any manner.

FIG. 1 shows an isometric view of the presently disclosed adjustable slide knob 100 in its 'prone' position (i.e., a position without user interaction). The knob 100 can be freely carried in this position without fear of accidental self-disassembly since it is a closed system that does not require external forces or interactions to keep the device fully assembled.

As shown in FIG. 1, knob 100 includes a knob housing 1, a partially threaded nut 2, and a retention pin 6 to retain the partially threaded nut 2. Knob housing 1 contains all major components of the knob 100 and maintains the alignment of all internal parts.

Figure 2:
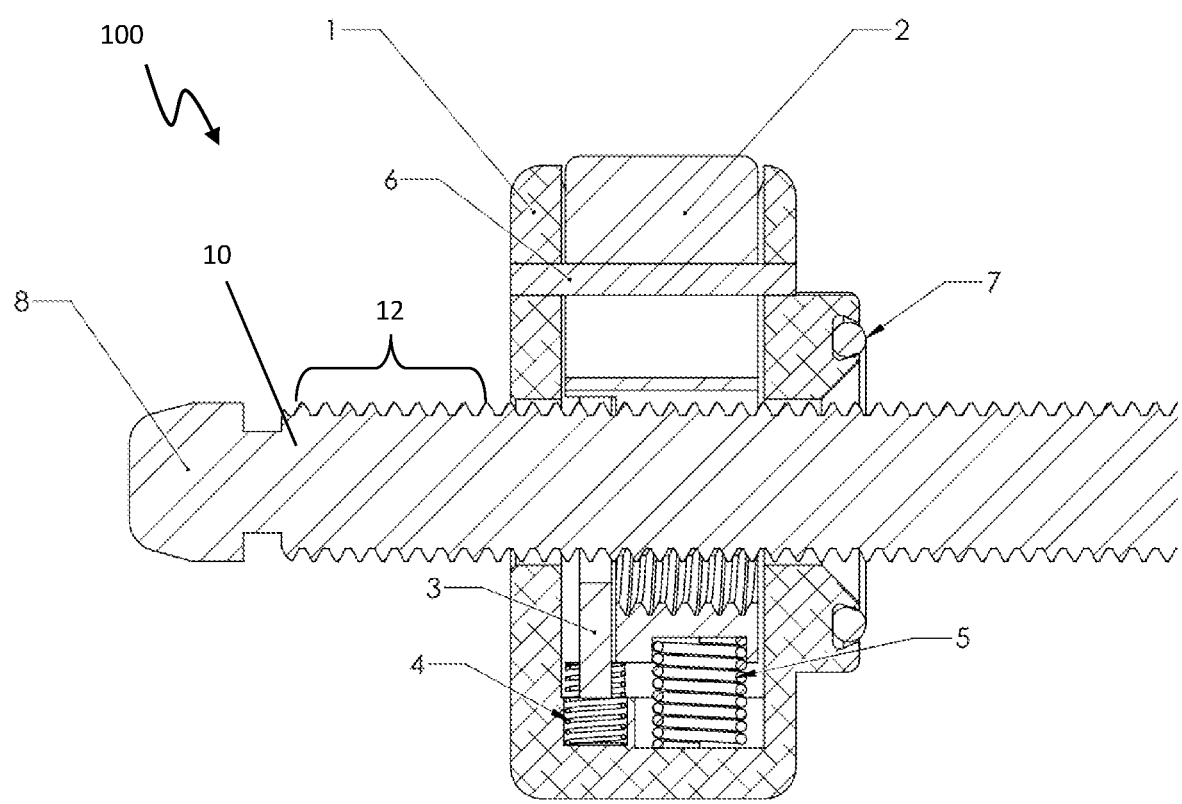
FIG. 2 shows a side cross-section view of the knob disengaged on a threaded shaft (e.g., with a user pressing on partially threaded nut)

FIG. 2 depicts the knob 100 while the user slides the knob housing 1 axially along a threaded rod 8. The partially threaded nut 2 engages with the threaded rod 8 using a matching thread pattern. As shown in FIG. 2, within the knob housing 1, is a locking tab 3, a locking tab spring 4, and a primary spring 5. Locking tab 3 couples with partially threaded nut 2, so that locking tab 3 and partially threaded nut 2 disengage from threaded rod 8 using the same action when in use. Locking tab spring 4 applies a load to locking tab 3, adding to the radial load partially threaded nut 2 imparts on the threaded rod 8. Primary spring 5 is the origin of most of the radial load the partially threaded nut 2 imparts on the threaded rod 8.

As previously mentioned, the threaded rod 8 contains a matching thread pattern to partially threaded nut 2. The threaded rod 8 also includes a cut from the shaft 10 that is large enough for locking tab 3 to self-engage and is cut closer to the central axis of the shaft 10 than the major thread diameter. This cut is referred to herein as a "key-way" 12.

In order for the insertion point to fully open with pressure on just partially threaded nut 2, several components are geometrically coupled with the partially threaded nut 2. Under the user's force, the locking tab 3, the locking tab spring 4, and the primary spring 5, will all depress at the same rate as the partially threaded nut 2, until the top of the retention through-hole/slot (an internal through-feature, located above the compound hole/slot) in the partially threaded nut 2 bucks against the retention pin 6, as depicted in FIG. 2.

Figure 3:
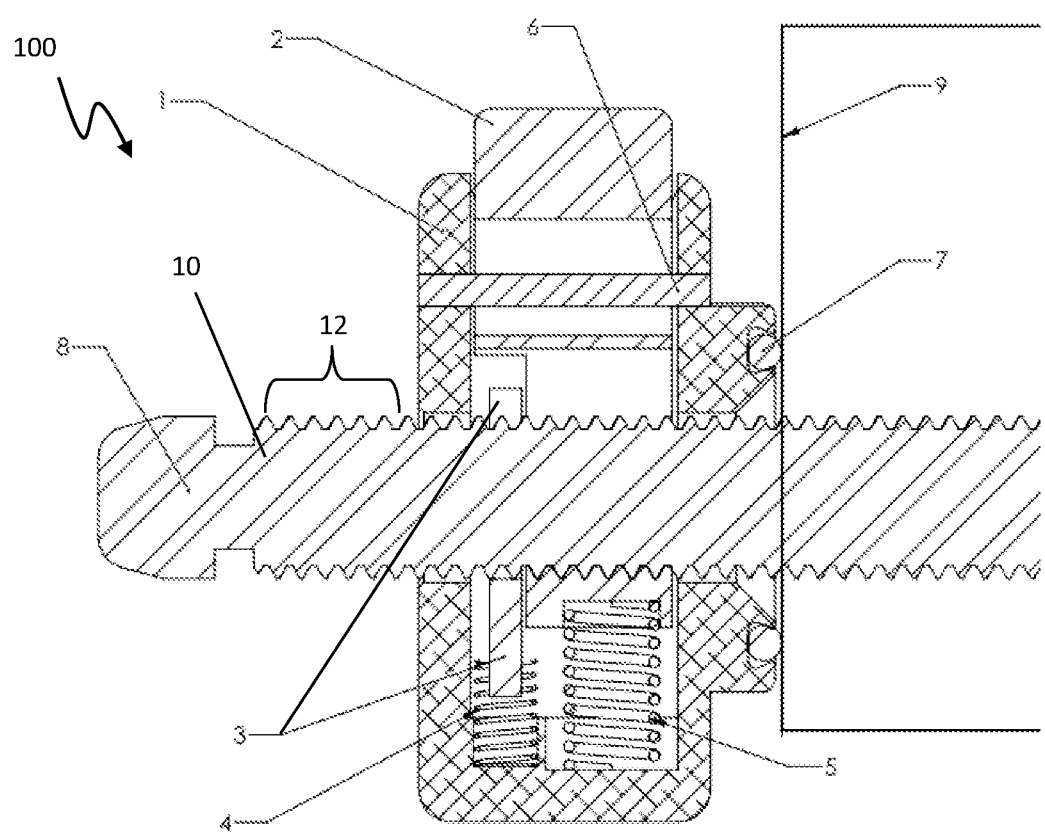
FIG. 3 shows a side cross-section view of the knob on a threaded shaft against a work surface (i.e., a standard use case)

FIG. 3 depicts the knob 100 operating under its standard use case. As shown in FIG. 3, threaded rod 8 is axially aligned with the insertion point of knob housing 1. FIG. 3 also shows a ring 7 that may be sandwiched between knob housing 1 and a work surface 9. The ring 7 may be a factory O-ring that is pressed into a 'dove-tail groove' in knob housing 1, to reduce damage knob housing 1 might cause to work surface 9. In some embodiments, the ring 7 may be made from PTFE or any other type of low friction, high load bearing plastic, or any low friction, high load bearing non-marring material. Work surface 9 can be any surface that a user wishes to fasten the knob 100 device against.

In FIG. 3, the thread pattern from partially threaded nut 2 is engaged with the thread pattern on threaded rod 8 but locking tab 3 is not engaged. Locking tab 3 will thus ride the thread pattern of threaded rod 8.

Figure 4:
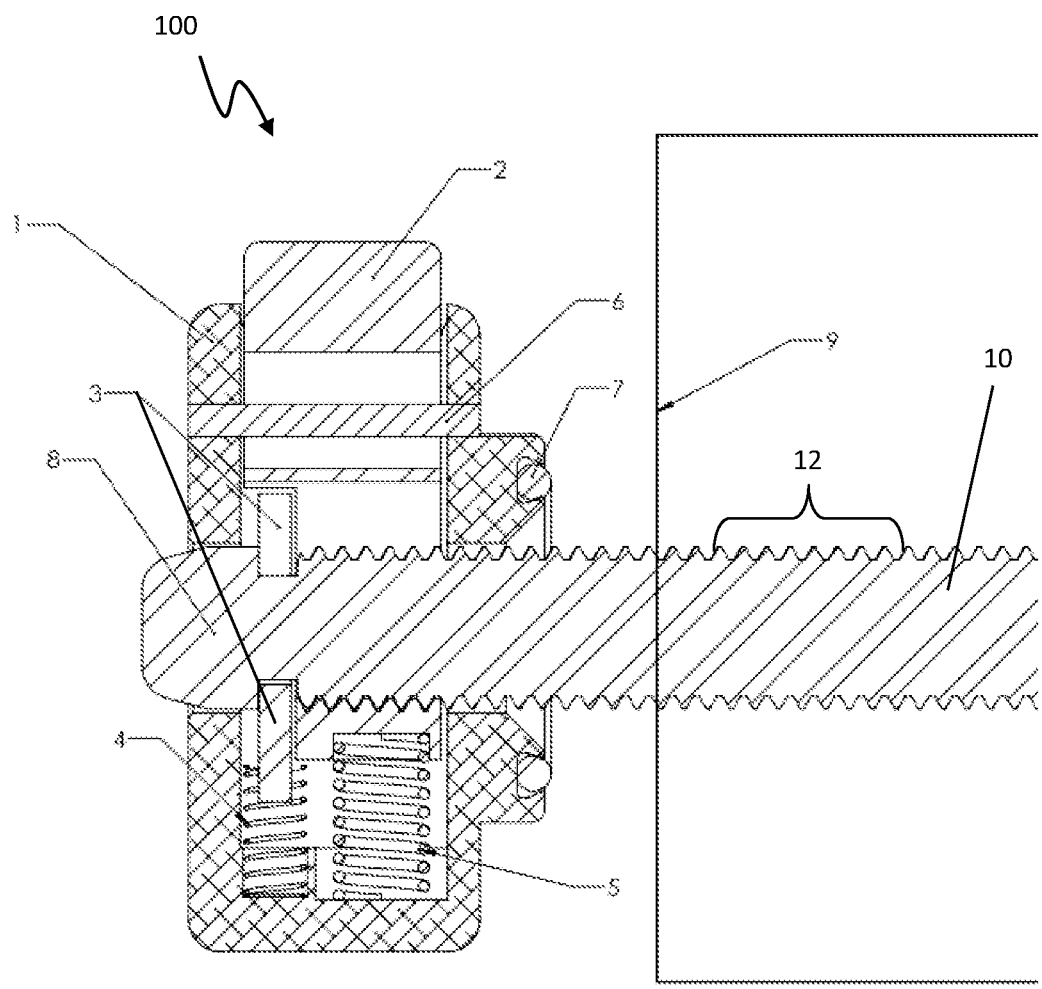
FIG. 4 shows a side cross-section view of the knob on a threaded shaft with lock engaged (backing off simulated)
Figure 5:
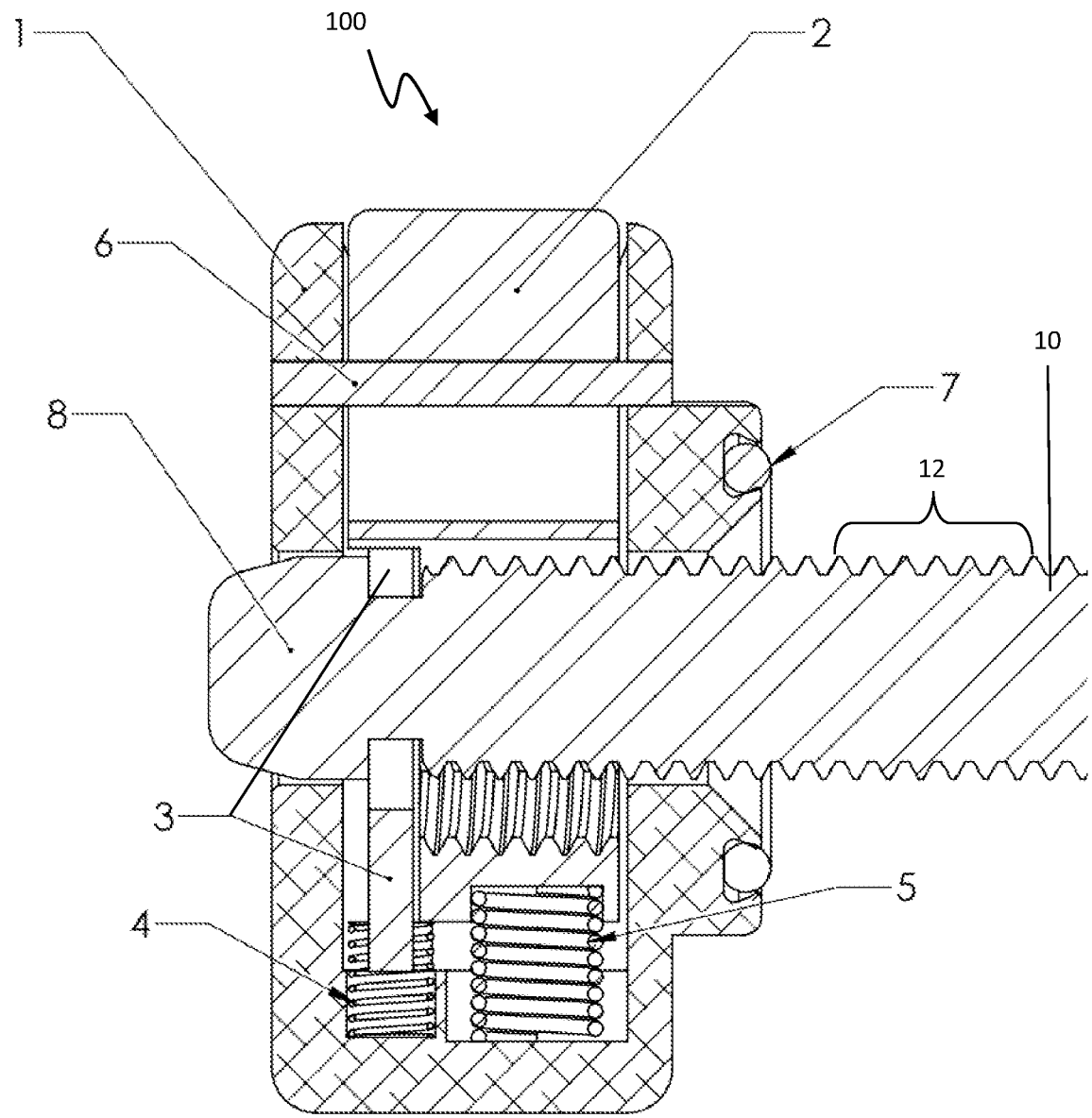
FIG. 5 shows a cross-section view of the knob disengaged along a threaded shaft at the lock location.

FIG. 4 depicts the knob 100 operating under its safety use case. As shown in FIG. 4, the threaded rod 8 is axially aligned with the insertion point of knob housing 1 and locking tab 3 is engaged into the slot in the threaded rod 8.

The location where locking tab 3 and the threaded rod 8 meet will be under an equivalent load to the threads that are still engaged with the threaded rod 8, in the direction of the work surface 9.

It should be appreciated that the knob housing 1 acts as a backing that the threaded rod 8 can brace against when the partially threaded nut 2 presses against the threaded rod 8, with force generated by the locking tab spring 4 and the primary spring 5.

Retention pin 6 retains the partially threaded nut 2 so that, incidentally, locking tab 3, locking tab spring 4, and primary spring 5 (inside knob housing 1) are retained by acting as a 'slot and pin' connection with the partially threaded nut 2. In order to do that, retention pin 6 is firmly seated in knob housing 1, across the hole intended for partially threaded nut 2 and its coupled parts mentioned above.

In the threaded rod 8, the lock slot can be deeper on the shaft 10 than the lowest part of the thread, and wider than the thickness of locking tab 3. The slot can have a sharp rigid edge to brace locking tab 3 when engaged.

Figure 6A:
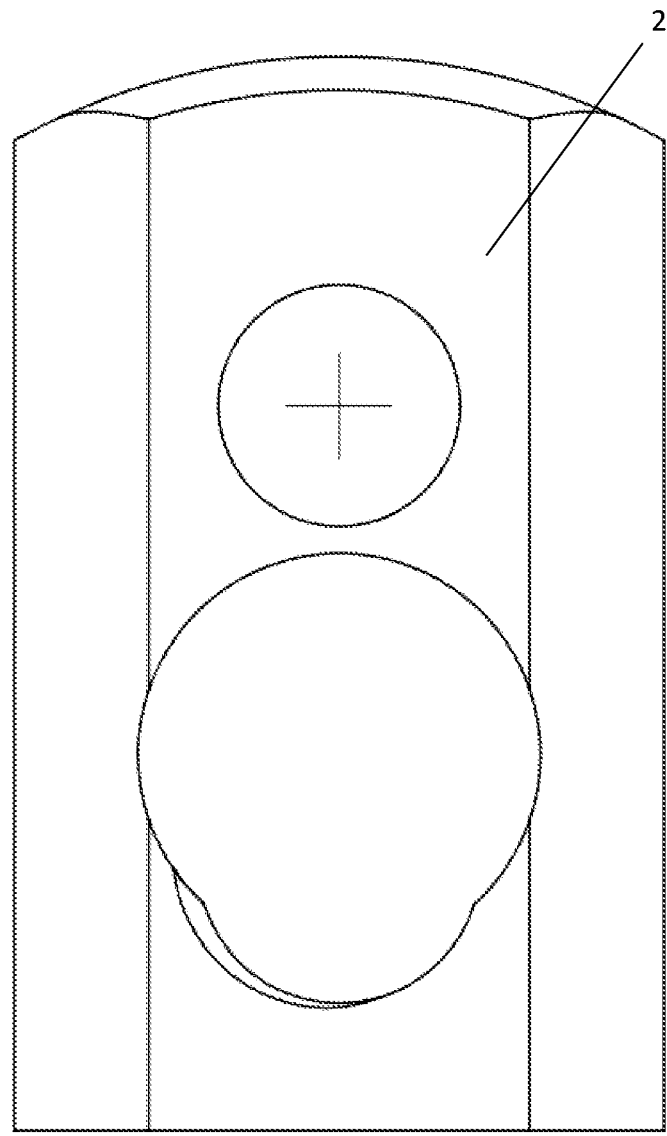
FIGS. 6A-6C illustrate a partially threaded nut. In particular.

In partially threaded nut 2, the compound through-hole may be comprised of a threaded through-hole 16 bisected by a slightly larger second through-hole/slot 18 whose axes are parallel. This compound through-hole can initially be made with a tapped/threaded through-hole 16 intersected by a slightly larger diameter/width through-hole/through-slot that retains the largest amount of thread possible, so that threaded rod 8 is still able to slide from the untapped section of the compound through-hole to engage the threaded portion of the through-hole unimpeded and without being removed from knob housing 1. This compound through-hole can have a shape and appearance similar to a Venn-diagram where one side of the diagram has a larger diameter than the other. The two features of this hole are aligned vertically along the front face of partially threaded nut 2, with the threaded section of the hole closer to the 'bottom' of the nut and the larger hole/slot closer to the 'top' surface the user interacts with (see FIG. 6A). Also, a second hole/slot can be added to trap retention pin 6 so that all items can be retained inside knob housing 1 (see FIG. 6A).

Figure 6B:
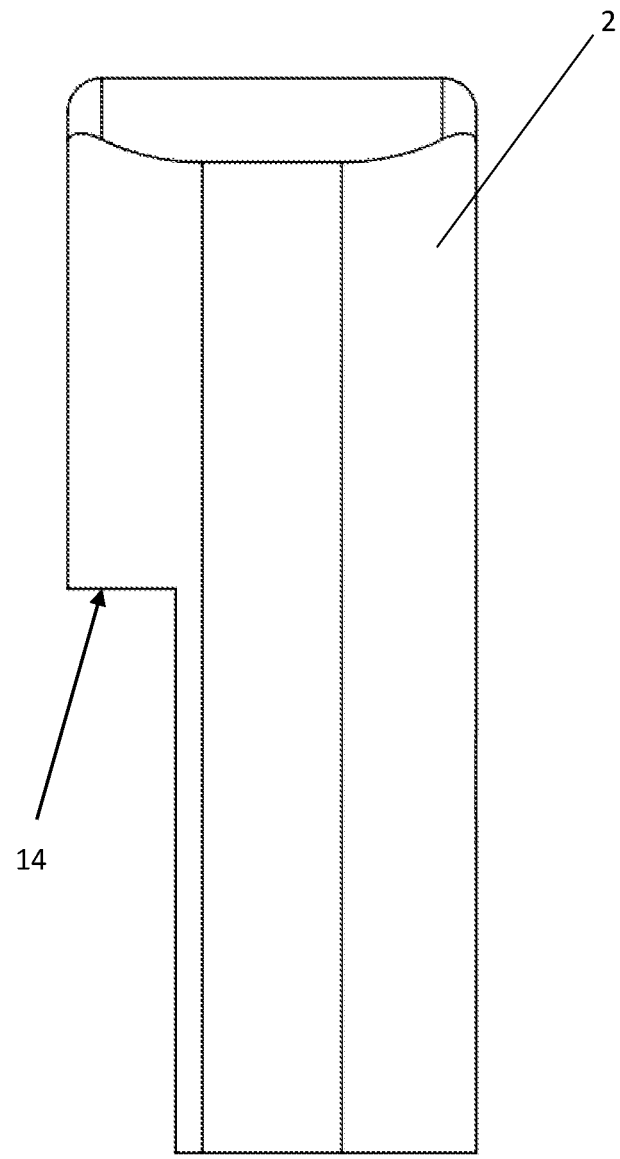
Figure 6C:
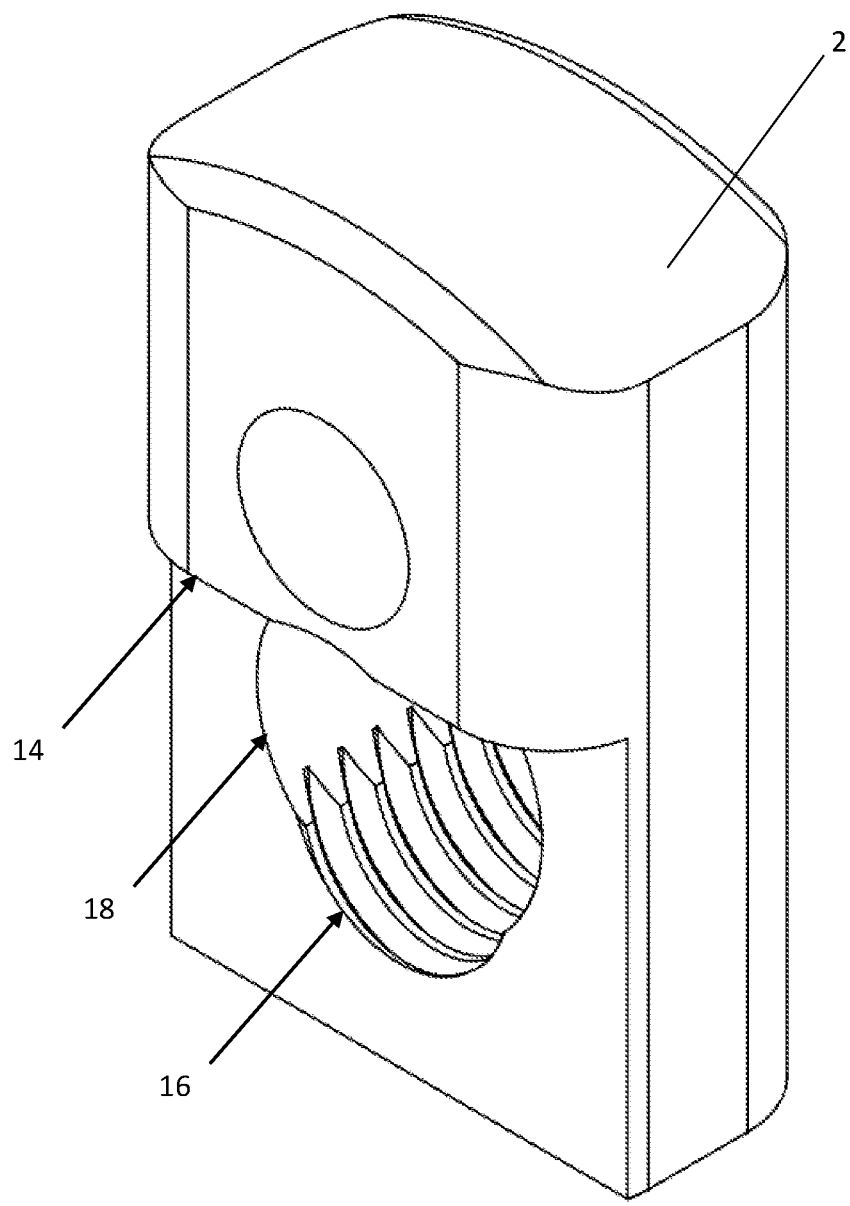

In some embodiments, a small shelf 14 may be cut on the underside of partially threaded nut 2 to couple locking tab 3 to it (see FIG. 6B). Locking tab 3 may be geometrically coupled so that when partially threaded nut 2 is engaged on the threaded rod 8 and locking tab 3 is not engaged in the key-way 12 on the threaded rod 8, then locking tab 3 separates from the shelf 14 and passively rides along the threads. It is only when locking tab 3 engages the key-way 12 on the threaded rod 8 that locking tab 3 is engaged at all. Partially threaded nut 2 may have a non-circular shape (e.g., rounded rectangle) to maintain geometric rigidity.

Knob housing 1 may include a dovetail cut to attach the ring 7. In these and other embodiments, knob housing 1 may include a through-hole centered and in line with the slot for partially threaded nut 2 in order to hold spring pin 6 and secure partially threaded nut 2, locking tab 3, locking tab spring 4, and primary spring 5 inside.

Figure 7:
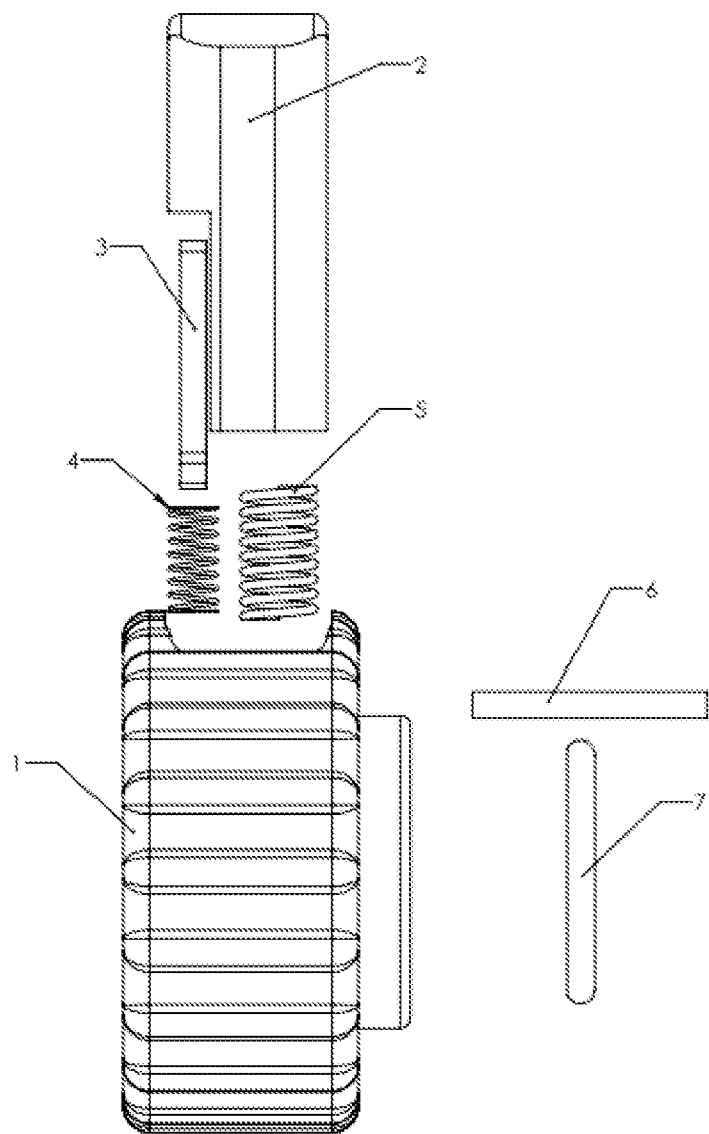
FIG. 7 shows an exploded side view of the knob, without a threaded shaft.
Figure 8:
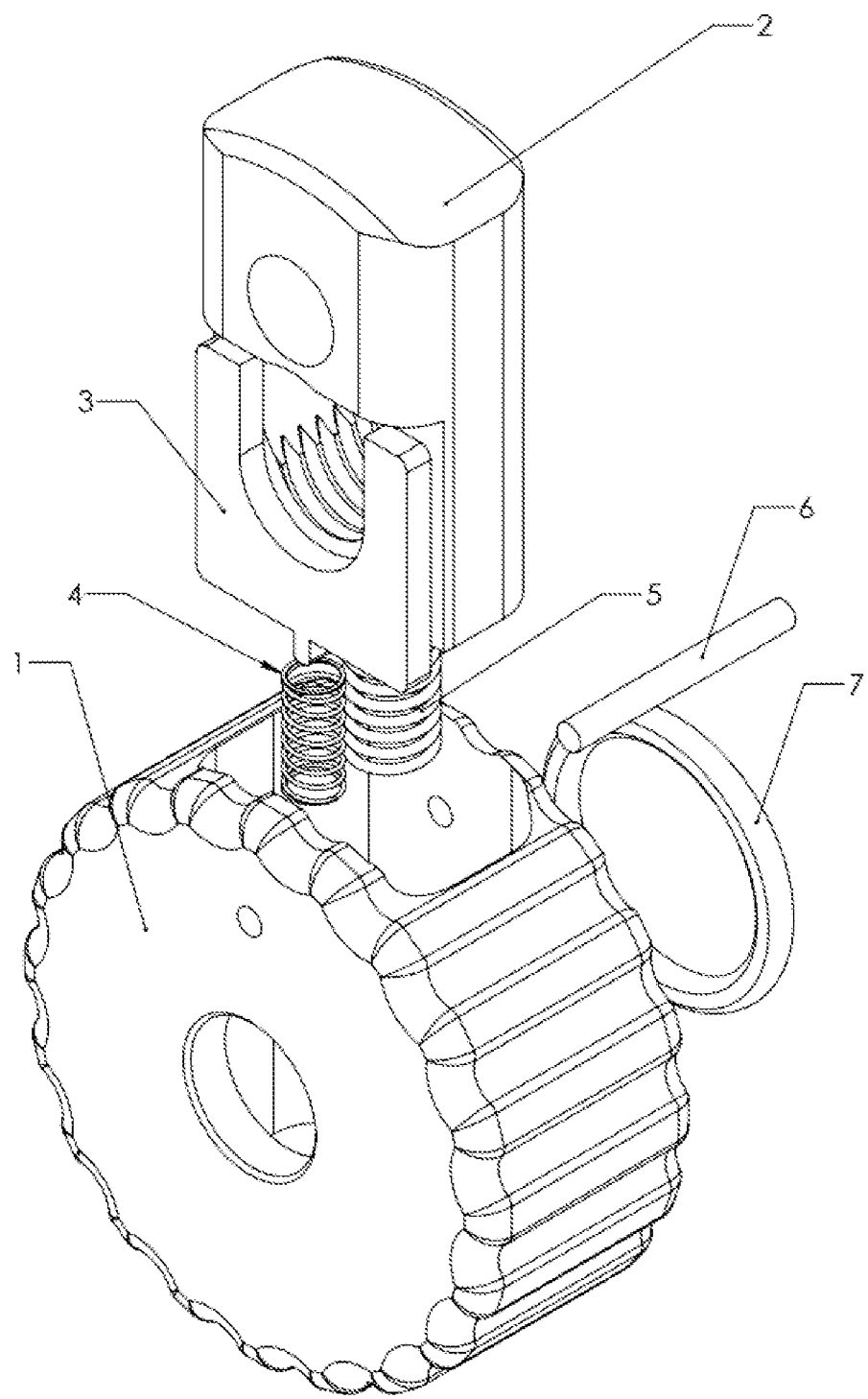
FIG. 8 shows an exploded isometric view of the knob, without a threaded shaft.

In operation, the insertion point of knob housing 1 is held axially in line with the threaded rod 8. The user will press partially threaded nut 2, which is geometrically coupled with locking tab 3, as shown in FIG. 7. This user input force will depress primary spring 5 and locking tab spring 4. As the user resists the spring force, it opens the insertion point in knob housing 1. The user then slides the device axially along the threaded rod 8 until the ring 7 bucks against work surface 9. The user will release partially threaded nut 2, allowing primary spring 5 and locking tab spring 4 to apply their force through partially threaded nut 2, radially into threaded rod 8, engaging their matching thread patterns.

The user can firmly grasp knob housing 1, taking care to NOT depress partially threaded nut 2, and can rotate the device in the direction where the thread will translate the device towards work surface 9, (on a right-handed thread this would be clockwise looking at the knob in its FIG. 1 position). This 'tightens' the knob 100 against the work surface 9, by increasing the thread pressure of the system and vastly increasing the clamping force of the device against the work surface. The user will leave the device maintaining pressure against the work surface. This position is depicted in FIG. 3.

While the device is in use against the work surface, the device could loosen or 'back off' from work surface 9, and the user may not have any idea. This situation poses a potential threat to the user when the device is implemented in any load bearing application. To prevent complete disengagement of the device from the threaded rod 8, putting the users at risk, knob 100 may include an internal locking tab system. This situation is depicted in FIG. 4, in which the safety system (which includes locking tab 3 and the threaded rod 8) will engage. Rotation and 'backing-off' of the device are entirely stopped once the side of locking tab 3 bears down on the side wall in the key-way 12 on the threaded rod 8.

Once the user is finished using the device, the user can depress partially threaded nut 2, disengaging it and the rest of the device from threaded rod 8. The user can then slide the device freely along threaded rod 8, to a new position or completely off, putting the device back into the prone position.

Many features of the disclosed adjustable slide knob 100 are not taught or suggested by the prior art. A few of the unique features of the disclosed adjustable slide knob 100 are discussed below.

The inclusion of locking tab 3 in a slide knob 100 is unique. Conventional adjustable knobs do not include a similar locking feature. As previously mentioned, the locking tab spring 4 pre-loads the locking tab 3. The inclusion of locking tab spring 4 in an adjustable knob is also unique as conventional adjustable knobs do not include a locking tab 3 or a locking tab spring 4 to pre-load the locking tab 3.

Conventional threaded rods also do not include a key-way, such as the key-way 12 that may be included in the threaded rod 8 described herein. As will be appreciated by one skilled in the art, a key-way 12 cut into threaded rod 8 may allow locking tab 3 to be securely retained on the threaded rod 8.

The non-circular shape (rounded rectangle) of the partially threaded nut 2 to maintain geometric rigidity is also unique. Conventional adjustable knobs do not include a through-hole/slot for the spring pin 6 to pass through and hold the locking tab 3, locking tab spring 4, and the primary spring 5 into the knob housing 1.

Conventional slide knobs do not include a retention pin 6, as described herein. Retention pin 6 is directly responsible for keeping the entire device assembled when not in use. The inclusion of a retention pin in an adjustable slide knob is unique.

The knob housing 1 may include a dovetail cut to secure the ring 7, which is not present in conventional slide knobs. Also, the pass-through holes for the spring pin 6 and the non-circular profile of the slot for the partially threaded nut 2 and its coupled components are all unique and contribute to the functionality and ease of use of the device.

Possible Benefits:

The locking tab 3 may be spring-loaded by the locking tab spring 4. The active safety lock engages when the knob has experienced an unexpected translation along the threaded rod 8, away from work surface 9, due to the device 'backing-off'. The locking tab 3 is poised to be thrusted into the cut key-way 12 on the threaded rod 8, as is depicted in FIG. 4.

The locking tab spring 4 is the secondary spring that applies pre-load directly to the locking tab 3, allowing it to function as intended, independent of external forces.

The knob housing 1 is the primary housing for the entire device and seats the ring 7, the locking tab spring 4, the primary spring 5, and the retention pin 6. The knob housing 1 also maintains alignment and acts as a guiding pathway for the partially threaded nut 2, and the locking tab 3. Knob housing 1 is the primary way in which the user will interact with the device to tighten it with a twisting motion against the work surface 9. The internal geometry of the insertion point will also act as the necessary face that partially threaded nut 2, will need to brace the threaded rod 8, against in order for the device to properly tighten to secure to the work surface 9.

The partially threaded nut 2 may include a geometric 'shelf' 14 cut into an internal surface, as shown in FIG. 6B, to couple with the locking tab 3. Partially threaded nut 2 can simplify the disengaging action of both this part and the locking tab 3, with a singular motion.

The ring 7 may aid in the low friction contact between the device and the work surface 9, to help increase the clamping force of the knob 100. Ring 9 may also protect the work surface 9 from potential damage caused by the knob housing 1 under extreme loads.

Possible Alternative Embodiments:

Although these features may not be illustrated in the accompanying figures, the disclosed devices and systems are intended to extend to other possible embodiments, such as those described below.

In some embodiments, the partially threaded nut 2 may be in the form of a cylinder. Although some cylindrical partially threaded nuts are known, current designs do not include a locking function. A conventional cylindrical partially threaded nut may be modified by adding a location for a lock on an existing adjustable slide nut design.

In these and other embodiments, the locking tab 3 may be a different geometry than as shown in the figures. Any geometry in which the locking tab 3 is pre-loaded by a force and fits into a slot/hole/channel cut into the threaded rod 8 is contemplated herein.

In other embodiments, the locking tab 3 may be decoupled from the partially threaded nut 2. In some such embodiments, a user would 'arm' the safety mechanism in the device 100 independently to the use case or position. The user would buck their knob against the work surface 9, and the user would then turn on the safety to the device.

In some embodiments, an alternative key-way could be cut into the threaded rod 8, that will interact with a version of the locking tab 3. In some such embodiments, the thread-per-inch of the threaded rod 8 can be converted into a translation distance per rotation measurement for the nut riding that thread. (For example, if in an embodiment the threaded rod 8 had 5 threads per inch, then the device would translate 0.2 inches per rotation.) In some embodiments, a key-way may be cut in line with the threaded rod 8, like a more traditional key-way and be as long as, at least, the sum of the thickness of the locking tab 3, and the translation distance per rotation. The geometry of the locking tab 3 may also be adjusted so that it had a protrusion in the radial direction of the threaded rod 8, when coupled with the partially threaded nut 2. In some such embodiments, the key-way may be thinner in width than the protrusion the locking tab 3. All such variations and possibilities are contemplated herein.

What is claimed is:

1. An adjustable slide knob configured to engage with a threaded rod, the adjustable slide knob comprising:
   a knob housing comprising:
      a locking tab;
      a locking tab spring positioned to apply a load to the locking tab; and
      a primary spring positioned to apply a radial load to the engaged threaded rod; and
   a partially threaded nut retained within the knob housing, wherein the locking tab couples with the partially threaded nut.

2. The adjustable slide knob of claim 1, wherein the partially threaded nut and the threaded rod each contain a matching thread pattern.

3. The adjustable slide knob of claim 1, wherein the threaded rod comprises a shaft cut with a key-way sized to allow the locking tab to self-engage.

4. The adjustable slide knob of claim 3, wherein the key-way is cut closer to a central axis of the shaft than a major thread diameter of the threaded rod.

5. The adjustable slide knob of claim 1, wherein the partially threaded nut further comprises a shelf cut into an underside of the partially threaded nut.

6. The adjustable slide knob of claim 5, wherein when the partially threaded nut is engaged on the threaded rod and the locking tab is not engaged in a keyway, the locking tab separates from the shelf and passively rides along threading of the threaded rod.

7. The adjustable slide knob of claim 1, wherein the locking tab and the partially threaded nut disengage from the threaded rod using a single action by a user.

8. The adjustable slide knob of claim 1, wherein the partially threaded nut has a curved surface.

9. The adjustable slide knob of claim 1, wherein the partially threaded nut has a non-circular shape.

10. The adjustable slide knob of claim 1, wherein the partially threaded nut comprises a compound through-hole comprising a threaded through-hole bisected by a second through-hole having a larger diameter than the threaded through-hole, wherein an axis of the threaded through-hole and an axis of the second through-hole are parallel.

11. The adjustable slide knob of claim 1, further comprising a ring positioned between the knob housing and a work surface.

12. The adjustable slide knob of claim 1, further comprising a retention pin to retain the partially threaded nut within the knob housing.

* * * * *